US010191163B2

(12) United States Patent
Coulter et al.

(10) Patent No.: US 10,191,163 B2
(45) Date of Patent: Jan. 29, 2019

(54) METHOD FOR THE ABSOLUTE CALIBRATION OF THE LOCATION AND ORIENTATION OF LARGE-FORMAT DETECTORS USING LASER RADAR

(71) Applicant: The United States of America as represented by the Administrator of the National Aeronautics and Space Administration, Washington, DC (US)

(72) Inventors: Phillip Coulter, Sewell, NJ (US); Raymond Ohl, Dayton, MD (US); Timothy Madison, Owings, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 414 days.

(21) Appl. No.: 15/176,921

(22) Filed: Jun. 8, 2016

(65) Prior Publication Data

US 2017/0357003 A1 Dec. 14, 2017

(51) Int. Cl.
*G01T 7/00* (2006.01)
*G01M 11/00* (2006.01)
*G01S 17/88* (2006.01)
*H04N 17/00* (2006.01)
*H04N 5/225* (2006.01)

(52) U.S. Cl.
CPC ............. *G01T 7/005* (2013.01); *G01M 11/00* (2013.01); *G01S 17/88* (2013.01); *H04N 5/2253* (2013.01); *H04N 17/002* (2013.01)

(58) Field of Classification Search
CPC ......... G01T 7/005; G01S 17/88; G01S 7/497; G01S 7/4972
See application file for complete search history.

(56) References Cited

U.S. PATENT DOCUMENTS 7,064,817 B1 * 6/2006 Schmitt ................. G01S 7/4972
356/139.01
2009/0086199 A1 * 4/2009 Troy ........................ G01C 1/04
356/251

* cited by examiner

*Primary Examiner* — Eric L Bolda
(74) *Attorney, Agent, or Firm* — Christopher O. Edwards; Bryan A. Geurts; Mark P. Dvorscak

(57) ABSTRACT

A method of mapping pixel locations of a detector array includes measuring a location on the detector array, initiating a frame readout of the detector array, measuring a location of one or more metrology targets on the detector array, analyzing the frame readout to identify a pixel at the location on the detector array, and defining a location of the identified pixel with respect to the location of the one or more metrology targets. Subsequent measurement of the metrology targets alone by another metrology system allows one to infer the six degree of freedom alignment of the detector array in space.

16 Claims, 2 Drawing Sheets

METHOD FOR THE ABSOLUTE CALIBRATION OF THE LOCATION AND ORIENTATION OF LARGE-FORMAT DETECTORS USING LASER RADAR

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

BACKGROUND

The disclosed embodiments generally relate to mapping detector pixel locations, and to aligning a detector accurately in an optical system such that a projected image is in plane with pixels of the detector (i.e., aligned in focus, tip/tilt, and boresight/field space).

Optical imaging systems are required to produce images with adequate resolution located on a range of pixels in a large format, active pixel array detector, The construction of optical systems thus requires accurate alignment of the active area of the detector in multiple degrees of freedom, depending on the sensitivity of optical image quality to detector orientation. This must be accomplished in a non-contact manner, because detectors are highly sensitive. A three dimensional, optical metrology sensor, such as a laser radar or Light Detection and Ranging (LiDAR) system, produces target location information in three dimensions and supplies its own illumination independent of external lighting sources or the optical system under construction. If the detector can image the LiDAR beam, then non-contact metrology of the detector's surface is possible. The ability to locate a particular pixel in a large format, active pixel array detector would be beneficial. Furthermore, having an ability to accurately align a large format active pixel array detector into an optical system such that locations of particular pixels or ranges of pixels may be established in a working coordinate system of the optical system would be advantageous.

SUMMARY

A method has been developed to directly measure and map the physical location and orientation of large format detector active pixel arrays in a given coordinate system in six degrees of freedom in a non-contact manner. This method can be used to aid in the optical alignment of various systems and instruments in both terrestrial and extraterrestrial applications, for example, in the aerospace and other industries. In particular, the method may be used for pupil alignment reference measurements made on various sensors, and sensors comprising large format detector active pixel arrays at the focus of an optical system. The non-contact technique involves using a LiDAR system to measure the physical location and orientation of detector pixels on a large format detector with respect to an array of metrology targets attached to the detector bench or housing. Subsequent measurement of the metrology targets alone by another metrology system allows one to infer the six degree of freedom alignment of the detector array during construction. This information can be used to align a detector in an optical system or interpolate image data from the detector and correlate image features with physical locations in real space.

This technique was developed during metrology testing of the Fine Guidance Sensor engineering test unit for the James Webb Space Telescope (JWST) project. One of the objectives of the metrology test was to directly measure the image location of the Fine Guidance Sensor's pupil alignment target in the telescope's coordinate system. To accomplish this, a large format detector was placed at the nominal location of the JWST telescope's exit pupil location, as defined in the coordinate system. This technique solved two technical challenges. The first was to place a detector accurately such that the telescope pupil image is in plane with the detector pixels. The second was that, once the detector alignment is accomplished, to establish the location of key features (which correspond to a unique pixel or range of pixels on the detector) in the image in the working coordinate system.

In at least one aspect of the disclosed embodiments, a method of mapping pixel locations of a detector array includes measuring a location on the detector array with a laser radar system, initiating a frame readout of the detector array, measuring, using the laser radar system to measure the location of one or more metrology targets on the detector array, analyzing the frame readout to identify a pixel at the location on the detector array measured by the laser radar system, and defining a location of the identified pixel with respect to the location of the one or more metrology targets.

The method may include translating the detector array and repeating the elements of the method for a plurality of locations on the detector array. Alternatively or in addition, the method may include re-pointing the LiDAR beam to another location on the detector array and subsequent detector readout to establish a pattern of multiple "spots" between repeat measurements of the external metrology targets.

The method may include storing a plurality of locations of identified pixels with respect to the location of the one or more metrology targets in a table.

Measuring a location on the detector array may include positioning the detector array approximately normal to a measurement beam emitted by the laser radar system, and using the laser radar system to record X, Y, and Z coordinates of the location on the detector.

Analyzing the frame readout to identify a pixel at the location on the detector array may include reading an output of each pixel in the frame readout and identifying a pixel at a center of a measurement beam emitted by the laser radar system. Various fitting or centroid algorithms may be used to find the center pixel or sub-pixel location of the LiDAR spot.

In at least one other aspect of the disclosed embodiments, an apparatus for mapping pixel locations of a detector array includes a laser radar system operable to measure a location on the detector array and operable to measure a location of one or more metrology targets on the detector array, and a computer operable to perform a frame readout of the detector array, analyze the frame readout to identify a pixel at the location on the detector array measured by the laser radar system, and define a location of the identified pixel with respect to the location of the one or more metrology targets.

The apparatus may include a stage for translating the detector array, and the laser radar system and computer may be operable to cause the stage to move the detector array to a plurality of positions, measure a location on the detector array while the detector array is at each of the plurality of positions, perform a frame readout of the detector array while each location on the detector array is being measured, measure a location of one or more metrology targets on the detector array, analyze each frame readout to identify a pixel at the location on the detector array measured by the laser radar system, and define a location of each identified pixel with respect to the location of the one or more metrology targets.

The apparatus may include a table in a memory of the computer, and the table may store a plurality of locations of identified pixels with respect to the location of the one or more metrology targets.

The computer may cause the stage to position the detector array normal to a measurement beam emitted by the laser radar system, and the laser radar system may measure a location on the detector array by recording X, Y, and Z coordinates of the location on the detector array.

The computer may analyze the frame readout to identify a pixel at the location on the detector array by reading an output of each pixel in the frame readout and identifying a pixel at a center of a measurement beam emitted by the laser radar system using a centroid or fitting routine.

BRIEF DESCRIPTION OF THE DRAWINGS

The foregoing aspects and other features of the embodiments are explained in the following description, taken in connection with the accompanying drawings, wherein.

DETAILED DESCRIPTION

Figure 1:
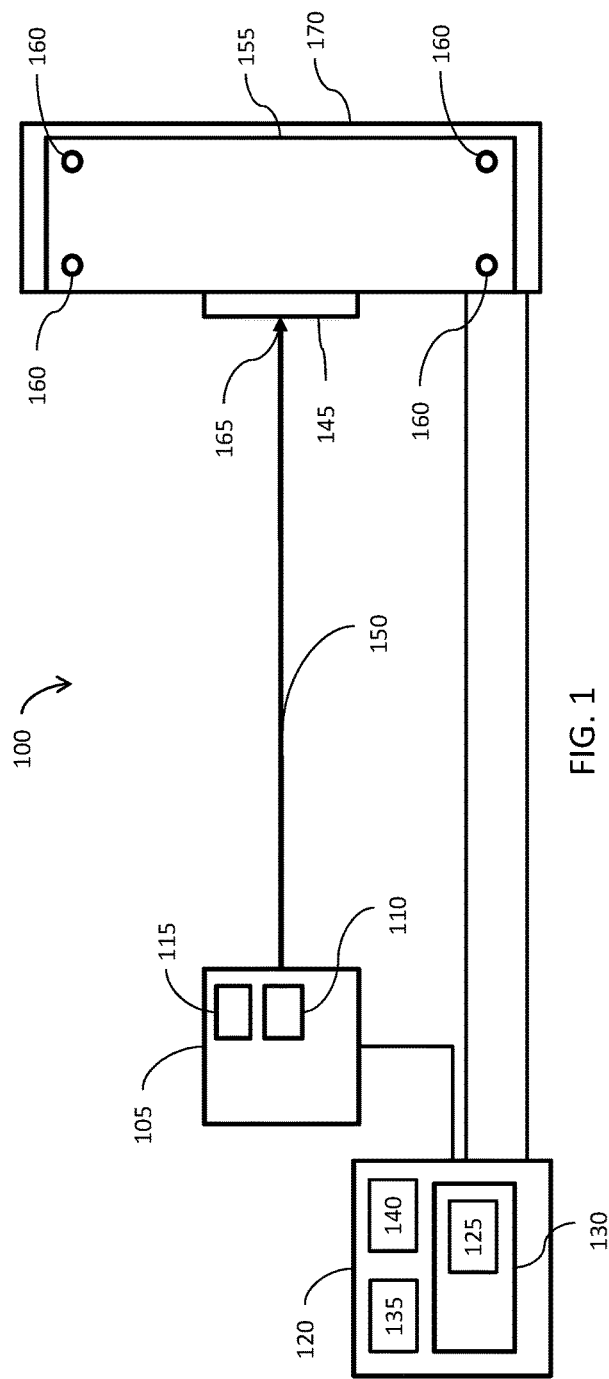
FIG. 1 illustrates an exemplary detector characterization system according to the disclosed embodiments.

FIG. 1 illustrates one embodiment of an exemplary detector characterization system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

The disclosed embodiments are directed to obtaining detector pixel location knowledge in 6 degrees of freedom. This knowledge can be applied to results derived from image analysis. The X, Y pixel value results for image analysis can be transformed into a three dimensional coordinate system. Using laser radar (i.e., focused LiDAR), the detector pixels may be physically mapped and then related to external metrology targets on the detector housing. The detector can next be aligned into a system, such as an optical instrument, using the metrology targets. For the purposes of the disclosed embodiments, the terms laser radar and LiDAR are used interchangeably.

The system 100 may also include a LiDAR system 105 with a laser 110 for illumination and a LiDAR detector array 115 for measuring return intensity and range. The laser 110 may produce ultraviolet, visible, or near infrared light with a beam divergence selected to illuminate a desired scene. For example, a near infrared laser may be used having a 20 degree or any suitable beam divergence. The laser beam divergence and gain may be adjustable in order to obtain a desired field of view, return intensity and range. The LiDAR detector array 115 may comprise, for example, a 256×256 PIN diode array or any detector array appropriate for use in a LiDAR system. The LiDAR detector array 115 may also have an adjustable gain and field of view in order to optimize the return intensity and range detection. The LiDAR system 105 generally provides output data in the form of range data in terms of X, Y, and Z values.

In at least one aspect of the disclosed embodiments, the detector characterization system 100 includes at least one computer 120 under the control of one or more programs in the form of computer readable program code 125 stored on at least one computer readable medium 130. The computer readable program code 125 stored on the at least one computer readable medium 130 may be implemented for carrying out and executing the operations of the detector characterization system 100 described herein. The computer readable medium 130 may be a memory of the computer 120. It should be understood that the computer readable medium 130 may store one or more operations for controlling the LiDAR system 105, for reading pixels, groups of pixels and full frames of a large format pixel array detector 145, for determining the locations of pixels of the large format pixel array detector 145, for determining the locations of metrology targets, for processing frames read from the pixel array detector 145, for storing pixel locations, metrology target locations, frames and any other data, for processing the data and mapping pixel locations, and for any other suitable processes for implementing the disclosed embodiments and techniques. Computer 120 may also include a microprocessor 135 for executing the computer readable program code 125 stored on the at least one computer readable medium 130. In at least one aspect, computer 120 may include one or more input or output devices, generally referred to as a user interface 140 which may operate to allow input to the computer 120 or to provide output from the computer 120.

The LiDAR system 105 emits a measurement beam 150 directed to the large format pixel array detector 145. The large format pixel array detector 145 may be mounted on or within a detector housing 155. The housing 155 may include a number of metrology targets 160. The metrology targets 160 may be specular spheres, spherically mounted retro-reflectors, or any other suitable metrology targets, permanently or temporarily mounted to the detector housing 155. The large format pixel array detector 145 and the detector housing 155 may be mounted on an actuator stage 170 capable of single or multi-axis movement under control of the computer 120. In at least one embodiment, the stage 170 may operate to translate the pixel array detector 145 in a direction perpendicular to the measurement beam 150.

Using the LiDAR system 105, pixels of the large format pixel array detector 145 are physically mapped and then related to the metrology targets 160 on the detector housing 155. A relationship is then established among the pixel locations and the metrology targets 160, enabling the pixel array detector 145 to be aligned into another system, such as an optical instrument.

Figure 2:
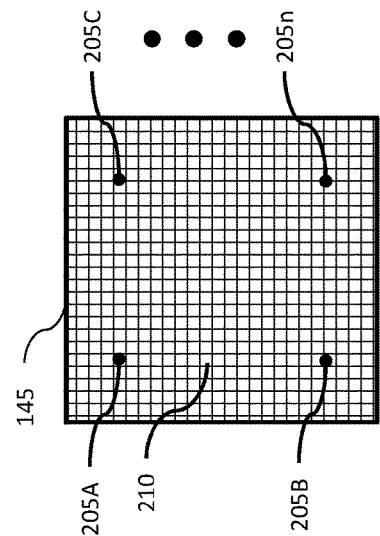
FIG. 2 shows a front view of a pixel array detector according to the disclosed embodiments.

FIG. 2 shows a front view of the pixel array detector 145. To accomplish the mapping, a measurement process and an analysis process may be initiated. The measurement process may be initiated by pointing and focusing the LiDAR system 105 on a location, for example, location 205A on the pixel array detector's active area 210. A surface point measurement of the location 205A may be made with the LiDAR system 105, while a full frame readout of the pixel array detector 145 may be captured. The surface point measurement may record the X, Y, Z coordinates of the exemplary location 205A on the pixel array detector surface as measured by the LiDAR system 105. The LiDAR system 105 may then be used to measure the location of one or more of the metrology targets 160. The surface point measurement, the full frame readout of the pixel array detector, and the metrology target location measurements, made with respect to the exemplary location 205A, may be stored for further processing. The measurement process may be repeated for more of locations 205B-205n.

Once the measurement process is complete, the analysis process may include an image analysis of each full frame readout to identify a pixel at each exemplary location 205A-205n in terms of X, Y values of the pixel array detector 145. Each X, Y pixel array detector location may be mapped to the corresponding LiDAR system X, Y, Z coordinates with respect to the metrology target locations. Thus, using the map, the location of each identified pixel may be defined with respect to the metrology target locations. The locations of remaining pixels that are not measured directly may be interpolated using the locations of the measured pixels, because the pixel pitch is tightly controlled during the pixel array detector's manufacturing processes. Once the pixel mapping is complete, the pose of each pixel and the pose of the pixel array detector 145 itself can be established in space using the metrology targets 160 on the detector housing 155.

Alternately, the analysis process may be combined with the measurement process such that after each surface point measurement, full frame readout of the pixel array detector 145, and related metrology target location measurements, for a particular pixel location 205A-205n, the corresponding X, Y pixel array detector location may be mapped to the corresponding LiDAR system X, Y, Z coordinates with respect to the metrology target locations, and incorporated into a table. Thus, in the table, the location of each identified pixel may be defined with respect to the metrology target locations. This process may be repeated until each X, Y pixel array detector location is mapped to the corresponding LiDAR system X, Y, Z coordinates with respect to the metrology target locations.

Figure 3:
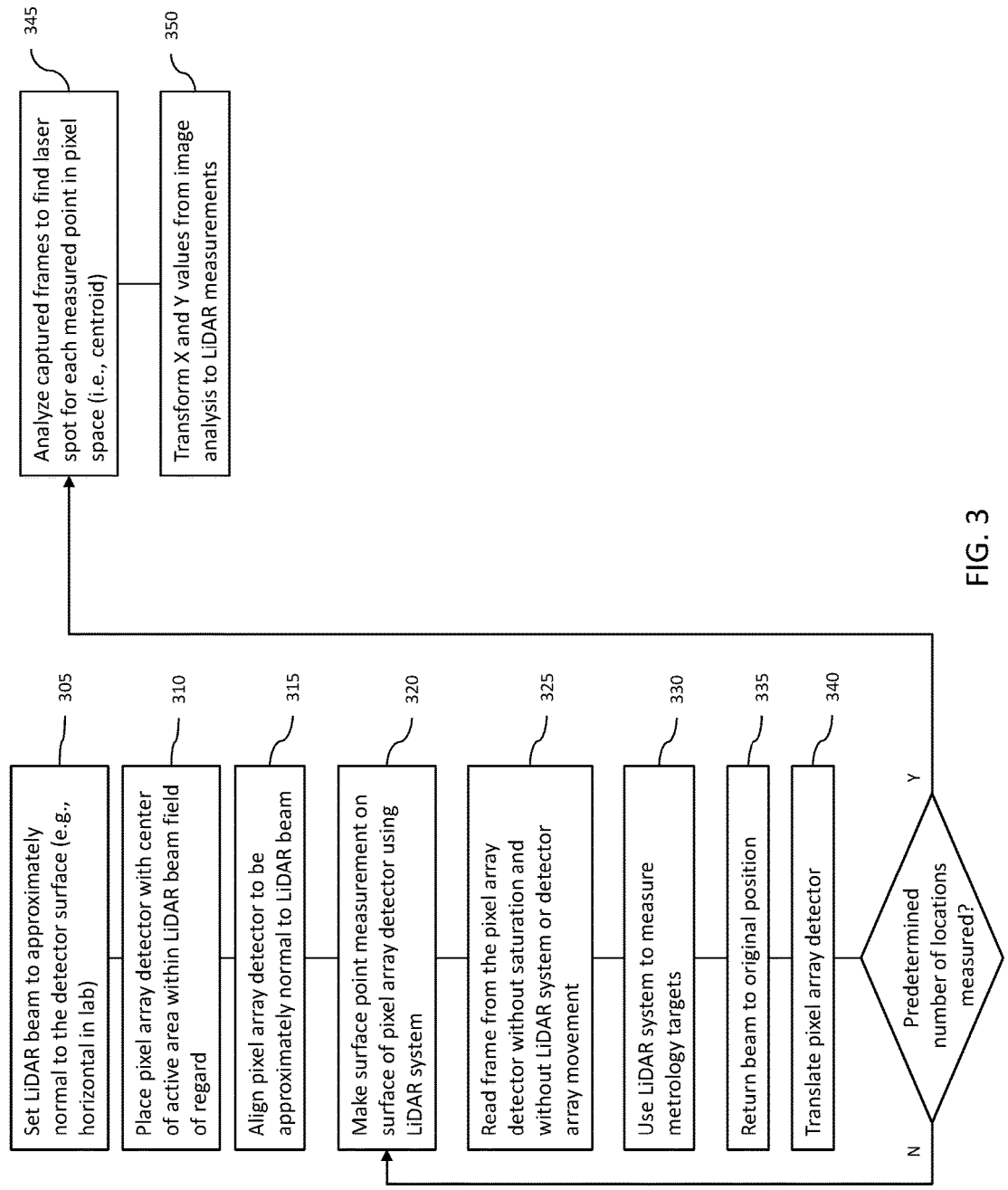
FIG. 3 shows an exemplary measurement and analysis process according to the disclosed embodiments.

The measurement and analysis process may generally be described in more detail as follows with respect to FIGS. 1 through 3. As shown in block 305, the LiDAR measurement beam 150 may be set to an elevation angle of approximately 90 degrees which may place the measurement beam 150 approximately horizontal to a ground or floor surface. The pixel array detector 145 may then be placed such that the measurement beam 150 at 90 degrees strikes an approximate center 165 of the pixel array detector 145, as displayed in block 310. The stage 170 under control of the computer 120 may be used to adjust the position of the pixel array detector 145. Referring to block 315, the pixel array detector 145 may be aligned so that it is normal to the 90 degree measurement beam 150. For example, the LiDAR system 105 may be used to measure a number of points on the surface of the pixel array detector 145 in polar coordinates and the pixel array detector position may be adjusted until the distance or radial polar coordinate of all the points is the same.

Using the LiDAR system 105, a surface point measurement may be made on the surface of the pixel array detector 145, for example at location 205A, as presented in block 320. Without moving the LiDAR system 105 or pixel array detector 145, a frame may be read out from the pixel array detector 145 with an exposure time set such that the pixel location 205A on which the LiDAR is focused is not saturated, as shown in block 325. The LiDAR system 105 may then measure the detector housing metrology targets 160, as displayed in block 330 using, for example, a tooling ball mode of measurement. Referring to block 335, the measurement beam 150 may be returned to its original horizontal position. The pixel array detector 145 may then be translated, by the stage 170 under control of the computer 120, so that the measurement beam 150 strikes a different location of the pixel array detector 145, for example, location 205B, as displayed in block 340. This process may be repeated until at least a predetermined number of pixel locations, for example, three to five, or as another example, locations 205B-205n, are measured on the pixel array detector 145, as presented in block 345.

The computer 120 may be utilized to perform image analysis on the captured frames to find a center of the measurement beam 150 for each measured point in pixel space in terms of X, Y coordinates on the pixel array detector 145, as shown in block 345. The X, Y coordinates on the pixel array detector 145 from the image analysis may be correlated with the LiDAR system X, Y, Z measurements, as shown in block 350, via a best-fit process, which links the detector X, Y location values to the LiDAR system X, Y, Z measured values for the pixel location and the metrology targets 160. As mentioned above, the locations of remaining pixels that are not measured directly may be interpolated using the locations of the measured pixels, because the pixel pitch is tightly controlled during the pixel array detector's manufacturing processes. Once the measurement and analysis process is complete, the pose of each pixel and the pose of the pixel array detector 145 itself can be established in space using the metrology targets 160 on the detector housing 155.

This technique is unique in that it provides a non-contact method for the mapping of pixels on the pixel array detector 145. The non-contact nature of this technique is advantageous, especially when the arrays are sensitive to low-force contact and electrostatic discharge. This technique may also be faster than measuring a detector using a coordinate measuring machine. This technique uses the laser radar and the detector's readout to locate the actual active pixel itself. In addition to large format pixel detectors, the disclosed structures and techniques may easily be extended to CMOS arrays, IR-sensitive detectors, and other detector technologies.

Using the structures and techniques disclosed herein, detector alignment can be precisely achieved, for example, to a level of tens of microns of absolute uncertainty in a mechanical coordinate system. The disclosed structures and techniques may be used in a wide range of applications involving detectors. For example, they may be implemented in the assembly and alignment verification of large focal plane arrays for telescopes or instruments with very large field of view requirements, such as imaging systems for commercial imagery satellites. Other exemplary applications may include the location and calibration in an absolute, mechanical coordinate system of the optical focus and other optical alignment indicators for an as-built optical system (e.g., pupil). The disclosed structures and techniques may also be utilized to improve field stop alignment and knowledge for telescope systems, for camera construction, and for the construction of medical instruments that use detectors, such as medical imaging scanners.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodi-

The invention claimed is:

1. A method of mapping pixel locations of a detector array comprising:
    measuring a location on the detector array;
    initiating a frame readout of the detector array;
    measuring a location of one or more metrology targets on the detector array;
    analyzing the frame readout to identify a pixel at the location on the detector array measured by the laser radar system; and
    defining a location of the identified pixel with respect to the location of the one or more metrology targets.

2. The method of claim 1, further comprising translating the detector array and repeating the elements of claim 1 for a plurality of locations on the detector array.

3. The method of claim 2, comprising storing a plurality of locations of identified pixels with respect to the location of the one or more metrology targets in a table.

4. The method of claim 3, comprising interpolating locations of unmeasured pixels from the locations of the identified pixels and a pixel pitch of the detector array.

5. The method of claim 1, comprising measuring the location on the detector array and a location of the one or more metrology targets in a non-contact manner.

6. The method of claim 5, comprising measuring the location on the detector array and a location of the one or more metrology targets with a laser radar system.

7. The method of claim 1, wherein measuring a location on the detector array comprises positioning the detector array normal to a measurement beam emitted by the laser radar system, and using the laser radar system to record X, Y, and Z coordinates of the location on the detector.

8. The method of claim 1, wherein analyzing the frame readout to identify a pixel at the location on the detector array comprises reading an output of each pixel in the frame readout and identifying a pixel at a center of a measurement beam emitted by the laser radar system.

9. An apparatus for mapping pixel locations of a detector array comprising:
    a measurement system operable to measure a location on the detector array and operable to measure a location of one or more metrology targets on the detector array; and
    a computer operable to:
        perform a frame readout of the detector array;
        analyze the frame readout to identify a pixel at the location on the detector array measured by the measurement system; and
        define a location of the identified pixel with respect to the location of the one or more metrology targets.

10. The apparatus of claim 9, comprising a stage for translating the detector array, wherein the measurement system and computer are operable to:
    cause the stage to move the detector array to a plurality of positions;
    measure a location on the detector array while the detector array is at each of the plurality of positions;
    perform a frame readout of the detector array while each location on the detector array is being measured;
    measure a location of one or more metrology targets on the detector array;
    analyze each frame readout to identify a pixel at the location on the detector array measured by the measurement system; and
    define a location of each identified pixel with respect to the location of the one or more metrology targets.

11. The apparatus of claim 10, comprising a table in a memory of the computer, the table storing a plurality of locations of identified pixels with respect to the location of the one or more metrology targets.

12. The apparatus of claim 11, wherein the computer is operable to interpolate locations of unmeasured pixels from the locations of the identified pixels and a pixel pitch of the detector array.

13. The apparatus of claim method of claim 9, wherein the measurement system is a non-contact measurement system.

14. The apparatus of claim 13, wherein the measurement system is a laser radar system.

15. The apparatus of claim 14, wherein the computer is operable cause the stage to position the detector array normal to a measurement beam emitted by the laser radar system, and the laser radar system is operable measure a location on the detector array by recording X, Y, and Z coordinates of the location on the detector array.

16. The apparatus of claim 14, wherein the computer is operable to analyze the frame readout to identify a pixel at the location on the detector array by reading an output of each pixel in the frame readout and identifying a pixel at a center of a measurement beam emitted by the laser radar system.

* * * * *